United States Patent
Robert et al.

(10) Patent No.: US 12,384,133 B2
(45) Date of Patent: Aug. 12, 2025

(54) MULTILAYER FILM FOR RECLOSABLE PACKAGE WITH A POLYETHYLENE LAYER OBTAINED BY FLAT SHEET COEXTRUSION

(71) Applicant: BOSTIK SA, Colombes (FR)

(72) Inventors: Christophe Robert, Venette (FR); Romain Puchois, Venette (FR)

(73) Assignee: BOSTIK SA, Colombes (FR)

( * ) Notice: Subject to any disclaimer, the term of this patent is extended or adjusted under 35 U.S.C. 154(b) by 472 days.

(21) Appl. No.: 17/998,271

(22) PCT Filed: May 5, 2021

(86) PCT No.: PCT/FR2021/050772
§ 371 (c)(1),
(2) Date: Nov. 9, 2022

(87) PCT Pub. No.: WO2021/240086
PCT Pub. Date: Dec. 2, 2021

(65) Prior Publication Data
US 2023/0226803 A1   Jul. 20, 2023

(30) Foreign Application Priority Data

May 26, 2020   (FR) .................................. FR2005557

(51) Int. Cl.
| | | |
|---|---|---|
| *B32B 7/12* | (2006.01) | |
| *B32B 7/027* | (2019.01) | |
| *B32B 27/08* | (2006.01) | |
| *B32B 27/18* | (2006.01) | |
| *B32B 27/30* | (2006.01) | |
| *B32B 27/32* | (2006.01) | |
| *B65D 65/40* | (2006.01) | |

(52) U.S. Cl.
CPC ............... *B32B 7/12* (2013.01); *B32B 7/027* (2019.01); *B32B 27/08* (2013.01); *B32B 27/18* (2013.01); *B32B 27/302* (2013.01); *B32B 27/32* (2013.01); *B65D 65/40* (2013.01); *B32B 2307/30* (2013.01); *B32B 2307/7244* (2013.01); *B32B 2307/7246* (2013.01); *B32B 2307/7376* (2023.05); *B32B 2435/02* (2013.01)

(58) Field of Classification Search
CPC ........ G05B 19/056; G05B 2219/13006; G05B 2219/13013; G05B 2219/13016; G05B 2219/13171; G11C 17/18; C04B 2103/0045; C04B 2103/46; C04B 41/009; C04B 41/52; C04B 33/00; C04B 35/00; C04B 41/45; C04B 41/4535; C04B 41/48; B32B 2250/03; B32B 2250/24; B32B 2270/00; B32B 2307/30; B32B 2307/31; B32B 2307/412; B32B 2307/536; B32B 2307/7242; B32B 2307/7244; B32B 2307/7246; B32B 2307/732; B32B 2307/7376; B32B 2307/744; B32B 2307/75; B32B 2435/02; B32B 2439/70; B32B 27/08; B32B 27/18; B32B 27/302; B32B 27/304; B32B 27/306; B32B 27/308; B32B 27/32; B32B 27/34; B32B 27/36; B32B 7/022; B32B 7/027; B32B 7/05; B32B 7/06; B32B 7/12; B65D 65/40; B65B 55/20
See application file for complete search history.

(56) References Cited

U.S. PATENT DOCUMENTS

| | | |
|---|---|---|
| 6,777,050 B1 | 8/2004 | Engelaere |
| 7,622,176 B2 | 11/2009 | Bardiot et al. |
| 10,787,595 B2 | 9/2020 | Robert |
| 2013/0233911 A1 | 9/2013 | Robert et al. |
| 2021/0114346 A1 | 4/2021 | Robert et al. |
| 2021/0402746 A1 | 12/2021 | Puchois et al. |

FOREIGN PATENT DOCUMENTS

| | | |
|---|---|---|
| EP | 1053952 A1 | 11/2000 |
| FR | 3023560 A1 | 1/2016 |
| FR | 3075091 A1 | 6/2019 |
| FR | 3088239 A1 | 5/2020 |
| WO | 02064694 A1 | 8/2002 |
| WO | 2012045950 A1 | 4/2012 |
| WO | 2012045951 A1 | 4/2012 |

OTHER PUBLICATIONS

ISA/EP; International Search Report and Written Opinion for International Patent Application No. PCT/FR2021/050772 dated Sep. 7, 2021, 10 pages.

*Primary Examiner* — Lawrence D Ferguson
(74) *Attorney, Agent, or Firm* — NK Patent Law

(57) ABSTRACT

A multilayer film comprises an adhesive layer A comprising an HMPSA composition (a); a complexable thin layer B comprising a PolyEthylene (PE) composition (b); and a heat-sealable and breakable layer C comprising a PolyEthylene (PE) composition (c). Layers B and C are bonded together by layer A. The film is characterized in that (i) the melt flow indices of compositions (b) and (c), denoted MFI(b) and MFI(c), respectively, are each between 2.5 and 15 g/10 minutes; and (ii) the melt flow index of composition (a), denoted MFI(a), is such that the ratios MFI(a)/MFI(b) and MFI(a)/MFI(c) are each between 1.5 and 10. A process for manufacturing the film comprises flat sheet coextrusion of composition (a) and of compositions (b) and (c) at a temperature of between 150° C. and 250° C. The multilayer film can be used for the manufacture of resealable packaging.

15 Claims, No Drawings

MULTILAYER FILM FOR RECLOSABLE PACKAGE WITH A POLYETHYLENE LAYER OBTAINED BY FLAT SHEET COEXTRUSION

CROSS-REFERENCE TO RELATED APPLICATIONS

This application is a U.S. National Stage application of International Patent Application No. PCT/FR2021/050772, filed on May 5, 2021, which claims the benefit of French Patent Application No. FR2005557, filed on May 26, 2020.

The subject of the present invention is a multilayer film comprising a layer consisting of a hot-melt pressure-sensitive adhesive composition and two polyethylene-based layers, which can be manufactured by a flat sheet coextrusion process, said process also being a subject of the invention. Finally, the invention relates to the use of said multilayer film for the manufacture of resealable packaging (or trays), intended in particular for packaging foodstuffs, notably perishable foodstuffs.

Multilayer films, one layer of which consists of a hot-melt pressure-sensitive adhesive composition and which are intended for the manufacture of resealable packaging (or trays), are known, notably from patent applications WO 02/064694, WO 12/045950 and WO 12/045951.

Resealable packagings, for example in the form of trays or bags, are used in the agrifood industry and in large-scale distribution for packaging perishable foodstuffs, notably fresh produce. Such packagings are also described by patent EP 1 053 952.

After the packaging has been opened for the first time and a portion of the food product that it contains has been consumed, the consumer can manually reseal the packaging substantially hermetically and can consequently, as appropriate, after placing it in a refrigerator, preserve the remaining portion of the product. A sequence of reopenings and resealings is also possible.

These packagings generally comprise a container (or receptacle) and a cover forming a lid, which are hermetically attached to each other by welding.

The more or less deep and relatively rigid receptacle consists of a multilayer sheet (also referred to as complex or composite sheet) having a minimum thickness of 200 µm, in general between 200 and 1000 µm. This sheet is thermoformed so as to have a flat bottom on which the food product rests, and a perimeter in the form of a flat band. This perimeter, which is generally parallel to the bottom, is bonded by welding to the flexible and flat cover, which consists of a multilayer film (also described as complex or composite film) which has a thickness generally between 30 and 150 µm, and which is sometimes denoted by the name "cover film".

During the opening of the packaging, the cover film is manually separated from the receptacle at the flat band of the perimeter. This operation reveals an adhesive layer on this flat band, both on the cover band and on the receptacle band which were previously in contact. These two (continuous or noncontinuous) adhesive layers, referred to as "daughters", result from the rupturing of an initial or "mother" adhesive layer or, optionally, from its separation (or detachment) from one of the two layers of the complex multilayer film which are adjacent to it. Said initial adhesive layer, referred to hereinbelow as layer A, is thus one of the layers of said multilayer complex film which is itself an element included either in the composite sheet which constitutes the receptacle or, preferably, in the cover film.

The two daughter adhesive layers that are present, after the packaging has been opened, on the bands located on the respective perimeter of the receptacle and of the cover, are therefore facing each other. Thus, it suffices to reposition the cover on the receptacle, in accordance with their position in the packaging before opening, in order to bring the two bands of daughter adhesive layers back into contact. Simple manual pressure then makes it possible to obtain resealing of the packaging.

The adhesive composition which constitutes the mother and daughter adhesive layers is thus necessarily a pressure-sensitive adhesive (PSA).

The pressure-sensitive adhesive compositions described in the abovementioned patent applications are hot-melt compositions comprising a tackifying resin and a styrene block copolymer including an elastomer block. The hot-melt pressure-sensitive adhesive compositions are also commonly referred to as HMPSAs, corresponding to the initials of the term "Hot-Melt Pressure-Sensitive Adhesive". They are substances which are solid at room temperature and which contain neither water nor solvent. Applied in the molten state, they solidify as they cool thus forming an adhesive layer which provides the bonding between the two thin layers of thermoplastic polymeric material to be assembled, while at the same time providing the corresponding packaging with the advantageous opening and reclosing properties.

The ease of opening of the packagings is closely linked to the properties of the PSA and more particularly to the force that must be applied, during the opening of the packaging (referred to hereinbelow as first opening), in order to obtain the rupture of the mother adhesive layer and/or the separation thereof from one of the two layers which are adjacent to it in the multilayer composite film mentioned previously.

The capacity of the packaging to reseal and the quality of the resealing obtained (referred to hereinbelow as the first resealing) are also important for having once again a substantially hermetic packaging which is thus capable of ensuring the preservation of its foodstuff contents. The quality of the first resealing is also closely linked to the properties of the PSA. It is evaluated by the force that must be applied, during the reopening (denoted hereinbelow as the second opening), in order once again to obtain the rupture and/or detachment of the adhesive layer that was formed by the repositioning of the two daughter adhesive layers, following the manual pressure applied on the perimeter of the packaging.

The multilayer complex film which is included either in the composite sheet which constitutes the receptacle of a resealable packaging or, preferably, in the cover film, generally includes, in addition to layer A consisting of a hot-melt pressure-sensitive adhesive (or HMPSA) composition:

a complexable thin layer B, and a heat-sealable and breakable thin layer C, layer A providing the connection between layers B and C.

Such a film offers the desired opening and resealing properties for the packaging.

The complexable layer B can be complexed (or laminated) with other layers for the production of the packaging, for example with a rigid layer for improving the mechanical strength of said film, for the purpose of manufacturing the receptacle.

The heat-sealable (term synonymous with heat-weldable) and breakable layer C ensures:

during the packaging of the food product, the closing of the packaging by heat-welding of the cover film on the receptacle, at the flat band of the perimeter; then the first opening of the packaging performed manually by the consumer, and obtained by rupturing the breakable zone located on the surface of layer C.

The performing of this first opening thus begins with the rupture of said breakable zone, and then continues with the propagation of the rupture along the adhesive layer A, until there is complete separation of the cover from the receptacle. This propagation takes place by rupturing the adhesive layer A in its bulk (termed cohesive rupture) and/or by rupturing the interface of said layer A with one and/or the other of the two adjacent layers B or C (termed adhesive rupture).

The heat-welding of the cover film on the receptacle is performed by means of bars (or clamping jaws) by bringing the zones to be assembled into hot contact under pressure, resulting in a solid assembly by interpenetration of the constituent materials of layer C of the film and of the superficial layer of the perimeter of the receptacle.

Layers B and C often consist of a polyolefin such as polyethylene (PE) or polypropylene (PP).

The prior art multilayer films for resealable packaging that have just been described are generally made by a blown-sleeve coextrusion process.

Such a process comprises:

the melting, in separate extruders, of the constituent compositions and materials of the layers A, B and C; and then the passage of the three corresponding flows through, respectively, three annular and concentric dies, included in an extrusion head, in order to form a tubular bubble (or sleeve) with three BAC layers, layer A being included between layers B and C.

The bubble thus formed is then subjected to radial expansion (relative to the annular die) and to drawing in the axial direction before being cooled.

In such a blown-sleeve coextrusion process, the risk of the HMPSA constituting layer A coming into direct contact with the elements of the coextrusion device is extremely limited, due to the inclusion of said layer between layers B and C, and to the cylindrical geometry of the sleeve.

Moreover, flat sheet coextrusion (known as "cast coextrusion") is a well-established technology in the field of plastic film manufacturing. It notably has two major advantages over a blown-sleeve coextrusion process.

The first is much higher productivity.

The second is that it can produce a plastic film that is likely to have better optical qualities, and notably improved transparency. This advantage is linked to the possibility offered by flat sheet coextrusion to cool the film more quickly, by means of a chill roll located in the immediate vicinity of the extrusion head, whereas for blown-sleeve coextrusion, cooling is ensured by air which is blown inside and outside the sleeve, immediately after the extrusion head. Improved transparency for a multilayer film used as a cover film for a package containing a foodstuff is very useful to better monitor the appearance of said foodstuff during its conservation phase, before consumption.

It is thus very desirable to envisage the manufacture of the multilayer films known in the prior art by flat sheet coextrusion.

However, in such a process, the passage of the flows corresponding to the compositions and materials which constitute the layers A, B and C to be coextruded is performed through rectangular dies, in such a way as to form a lap (or curtain) with three BAC layers, layer A being included between layers B and C.

Thus, due to the rectangular geometry of the dies included in the extrusion head, the lap in the form of which such a multilayer film is produced and whose thickness can vary from 30 to 150 μm necessarily comprises two edges, which are parallel to the direction of advance of the film in the device.

Now, the presence of these two edges poses a serious problem.

Indeed, and contrary to the blown-sleeve coextrusion process, there is a risk that the hot-melt pressure-sensitive adhesive (or HMPSA) composition constituting layer A is exuded from the multilayer film at the edges, which would have the effect of making said edges sticky, due to the high tack of said composition notably linked to the presence therein of a tackifying resin. The presence of such sticky edges, liable to come into contact with the elements of the device for performing the process, can disrupt the smooth running of said device, even leading to the stoppage of the facility.

The aim of the present invention is to avoid such a risk.

Another aim of the present invention is to provide a multilayer film for resealable packaging, which has:

a first-opening force which is suitable for easy opening of the packaging by the consumer, and a second-opening force which provides, after the first resealing of the packaging by the consumer, substantially hermetic resealing.

Another object of the present invention is to provide a multilayer film whose manufacture via a flat sheet coextrusion process does not give rise, during the implementation of said process, to the presence of sticky edges, or in which the risk of the presence of such sticky edges is reduced.

Another object of the present invention is to provide a multilayer film which can be manufactured by a flat sheet coextrusion process and which has improved homogeneity, notably as regards its appearance and thickness.

Another object of the present invention is to provide a multilayer film which has improved transparency.

Another object of the present invention is to provide a multilayer film that can be manufactured by an industrial process with higher productivity.

It has now been found that these objectives can be totally or partly met by means of the multilayer film according to the invention which is described hereinbelow.

One subject of the present invention is thus firstly a multilayer film comprising:

an adhesive layer A consisting of an extrudable HMPSA composition (a);

a complexable thin layer B consisting of a PolyEthylene (PE) composition (b) denoted PE(b); and a heat-sealable and breakable layer C consisting of a PolyEthylene (PE) composition (c) denoted PE(c);

layers B and C being bonded together by layer A and said film being characterized in that:

(i) the melt flow indices of compositions (b) and (c), measured in g/10 minutes at a temperature of 190° C. and a total weight of 2.16 kg, and denoted MFI(b) and MFI(c), respectively, are each between 2.5 and 15 g/10 minutes; and (ii) the melt flow index of the HMPSA composition (a), measured in g/10 minutes at a temperature of 190° C. and a total weight of 2.16 kg, and denoted MFI(a), is such that the ratios MFI(a)/MFI(b) and MFI(a)/MFI(c) are each between 1.5 and 10.

Layers B and C are bonded together by layer A. The corresponding triple layer is represented by the notation B/A/C, in which the sign "/" means that the faces of the layers concerned are in direct contact.

The Melt Flow Index (MFI) is measured for each of the compositions (b) and (c) constituting layers B and C, respectively, and also for the HMPSA composition (a) constituting layer A, under the same conditions: i.e. at 190° C. and for a total weight of 2.16 kg, in accordance with condition d) of the standard ISO 1133. The MFI is the mass of composition (previously placed in a vertical cylinder and expressed in grams) that flows in 10 minutes through a die with a fixed diameter, under the effect of a pressure exerted by a charged piston having a total weight of 2.16 kg. Unless otherwise mentioned, the MFI values indicated in the present text were measured and expressed under these same conditions.

It has been found, by tests conducted by the Applicant, that the satisfaction of conditions (i) and (ii) by the MFIs of the HMPSA constituting layer A and of the compositions constituting layers B and C makes it possible, during the manufacture of the ABC three-layer film by flat sheet coextrusion, to avoid the presence of sticky edges in the lap produced at the outlet of the extrusion head. The three-layer film thus obtained has a uniform thickness and a homogeneous appearance, making it suitable for use in packaging, notably for packaging foodstuffs. Finally, said three-layer film has first-opening force and second-opening force values which are suitable for its use in the manufacture of resealable packaging.

According to a preferred embodiment of the multilayer film that is the subject of the invention, the melt flow indices MFI(b) and MFI(c) are each between 3 and 10 g/10 minutes, and the ratios MFI(a)/MFI(b) and MFI(a)/MFI(c) are each between 2 and 9.

According to an even more preferred variant, the melt flow indices MFI(b) and MFI(c) are each between 3.5 and 8 g/10 minutes, and the ratios MFI(a)/MFI(b) and MFI(a)/MFI(c) are each between 2.2 and 8.

According to one embodiment of the invention, the melt flow index of the HMPSA composition (a), i.e. MFI(a), is in a range from 4 to 100 g/10 minutes, preferably from 4 to 70, more preferably from 5 to 50, and even more preferably from 10 to 30.

Constituent Extrudable HMPSA Composition (a) of the Adhesive Layer A

The extrudable HMPSA (or hot-melt pressure-sensitive adhesive) composition (a) comprises, on the basis of the total weight of said composition:
from 40% to 70% by weight of a composition (a1) of styrene block copolymers comprising at least one elastomer block, said composition (a1) consisting, on the basis of its total weight:
of 10% to 90% by weight of at least one diblock copolymer chosen from the group comprising SI, SBI, SIB, SB, SEB and SEP, and
of 10% to 90% by weight of at least one triblock copolymer chosen from the group comprising SIS, SIBS, SBS, SEBS and SEPS;
the total content of styrene units of said composition (a1) ranging from 10% and 40% by weight on the basis of the total weight of (a1); and
from 30% to 60% by weight of one or more tackifying resins (a2).

Composition (a1) of Styrene Block Copolymers Comprising at least One Elastomer Block The styrene block copolymers used in composition (a1) have a weight-average molar mass Mw generally between 50 kDa and 500 kDa.

These styrene block copolymers consist of blocks of various polymerized monomers including at least one polystyrene block, and are prepared by radical polymerization techniques.

Unless otherwise indicated, the weight-average molar masses $M_w$ that are given in the present text are expressed in daltons (Da) and are determined by gel permeation chromatography, the column being calibrated with polystyrene standards.

The triblock copolymers include two polystyrene blocks and one elastomer block. They can have various structures: linear, star (also called radial), branched or else comb. The diblock copolymers include one polystyrene block and one elastomer block.

The triblock copolymers have the general formula:

$$ABA \qquad (I)$$

in which:
A represents a styrene (or polystyrene) non-elastomer block, and
B represents an elastomer block which may be:
polyisoprene. The block copolymer then has the structure: polystyrene-polyisoprene-polystyrene and has the name SIS;
polyisoprene followed by a polybutadiene block. The block copolymer then has the structure: polystyrene-polyisoprene-polybutadiene-polystyrene and has the name SIBS;
polybutadiene. The block copolymer then has the structure: polystyrene-polybutadiene-polystyrene and has the name SBS;
totally or partially hydrogenated polybutadiene. The block copolymer then has the structure: polystyrene-poly(ethylene-butylene)-polystyrene and has the name: SEBS;
totally or partially hydrogenated polyisoprene. The block copolymer then has the structure: polystyrene-poly(ethylene-propylene)-polystyrene and has the name SEPS.

The diblock copolymers have the general formula:

$$A\text{-}B \qquad (II)$$

in which A and B are as defined previously.

When composition (a1) comprises several triblock styrene copolymers, the latter being chosen from the group comprising SIS, SBS, SEPS, SIBS and SEBS, it is clearly understood that said triblocks can belong to just one or to several of these five copolymer families. The same is true, mutatis mutandis, for the diblock copolymers.

It is preferred to use a composition (a1) comprising a triblock copolymer and a diblock copolymer having the same elastomer block, owing in particular to the fact that such blends are commercially available.

According to a particularly preferred implementation variant, the content of diblock copolymer in composition (a1) may range from 15% to 80%, preferably from 50% to 80%.

According to a particularly advantageous embodiment of the constituent composition (a) of the layer A included in the multilayer film according to the invention, composition (a1) consists of an SIS triblock copolymer and of an SI diblock copolymer. In this case, the total content of styrene units in composition (a1) preferably ranges from 10% to 25%.

The triblock copolymers included in composition (a1) preferably have a linear structure.

The styrene block copolymers comprising an elastomer block, in particular of SI and SIS type, that can be used in composition (a) are commercially available, often in the form of triblock/diblock blends.

Kraton® D1111 from the company Kraton and Quintac® 3520 and Quintac® 3433 N from the company Zeon Chemicals are examples of compositions (a1) consisting of SIS and SI.

Kraton D1111 is a composition of which the overall content of styrene units is 22%, and which consists of 82% of linear SIS triblock copolymer of $M_w$ approximately 250 kDa, and 18% of SI diblock copolymer of $M_w$ approximately 100 kDa.

Quintac® 3520 is a composition which consists, respectively, of 22% and of 78% of linear SIS triblock ($M_w$ approximately 300 kDa) and of SI diblock ($M_w$ approximately 130 kDa), and the total content of styrene units of which is 15%.

Quintac® 3433 N is a composition which consists, respectively, of 44% and of 56% of linear SIS triblock ($M_w$ approximately 220 kDa) and of SI diblock ($M_w$ approximately 110 kDa), and the total content of styrene units of which is 16.5%.

Tackifying Resins (a2)

The constituent HMPSA composition (a) of the layer A also comprises one or more tackifying resins (a2).

The tackifying resin(s) (a2) that can be used have weight-average molar masses $M_w$ of generally between 300 and 5000 Da and are chosen in particular from:
  (i) rosins of natural origin or modified rosins, for instance the rosin extracted from pine gum, wood rosin extracted from tree roots and derivatives thereof which are hydrogenated, dehydrogenated, dimerized, polymerized or esterified with monoalcohols or polyols, such as glycerol;
  (ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;
  (iii) terpene resins generally resulting from the polymerization of terpene hydrocarbons, for instance monoterpene (or pinene), in the presence of Friedel-Crafts catalysts, which are optionally modified by the action of phenols;
  (iv) copolymers based on natural terpenes, for example styrene/terpene, α-methylstyrene/terpene and vinyltoluene/terpene.

According to a preferred variant, the softening temperature (or point) of the tackifying resins that can be used in the composition according to the invention can range from 5 to 140° C. The softening temperature is determined in accordance with the standardized test ASTM E 28, the principle of which is as follows. A brass ring with a diameter of approximately 2 cm is filled with the resin to be tested, in the melted state. After cooling to room temperature, the ring and the solid resin are placed horizontally in a thermostatically maintained glycerol bath with a temperature which can vary by 5° C. per minute. A steel ball with a diameter of approximately 9.5 mm is centered on the disk of solid resin. The softening temperature is that temperature, during the phase of temperature increase of the bath at a rate of 5° C. per minute, at which the disk of resin yields by a height of 25.4 mm under the weight of the ball.

According to a preferred variant, use is made of aliphatic resins belonging to categories (ii) or (iii) for which mention may be made, as examples of commercially available resin, of:
  (ii) Escorez® 1310 LC available from Exxon Chemicals, which is a resin obtained by polymerization of a mixture of unsaturated aliphatic hydrocarbons having approximately 5 carbon atoms, and which has a softening temperature of 94° C. and a weight-average molar mass Mw of approximately 1800 Da; Escorez® 5400 also from Exxon Chemicals, which is a resin obtained by polymerization then hydrogenation of a mixture of unsaturated aliphatic hydrocarbons having approximately 9 or 10 carbon atoms and which has a softening temperature of 100° C. and an Mw of approximately 570 Da; Regalite® R1125, available from Eastman, which is a totally hydrogenated resin having a softening temperature of 123° C. and a weight-average molar mass Mw of 1200 Da.
  (iii) Dercolyte® S115 available from Dérivés Résiniques et Terpéniques (or DRT), which is a terpene resin having a softening temperature of 115° C. and an Mw of approximately 2300 Da.

According to a preferred variant, the constituent HMPSA composition (a) of the layer A essentially consists of:
  from 40% to 70% of the composition (a1) of styrene block copolymers; and
  from 30% to 60% of at least one tackifying resin (a2) having a softening temperature of between 5 and 140° C.

According to another preferred variant, the constituent HMPSA composition (a) of the layer A comprises or essentially consists of:
  from 50% to 70% of the composition (a1) of styrene block copolymers; and
  from 30% to 50% of at least one tackifying resin (a2) having a softening temperature of between 5 and 140° C.

According to yet another preferred variant, the constituent HMPSA composition (a) of the layer A can also comprise, in addition to the composition (a1) and the tackifying resin(s) (a2), from 0.1% to 2% of one or more stabilizers (or antioxidants). These compounds are introduced in order to protect the composition from degradation resulting from a reaction with oxygen which is liable to be formed by the action of heat, light or residual catalysts on certain starting materials, such as the tackifying resins. These compounds can include primary antioxidants, which trap free radicals and are generally substituted phenols, such as Irganox® 1010 from Ciba. The primary antioxidants can be used alone or in combination with other antioxidants, such as phosphites, for instance Irgafos® 168 also from Ciba, or else with UV-stabilizers such as amines The composition (a) can also comprise a plasticizer, but in an amount not exceeding 5%. As plasticizer, use may be made of a paraffinic and naphthenic oil (such as Primol® 352 from the company ESSO) optionally comprising aromatic compounds (such as Nyflex 222B).

Finally, the composition (a) can comprise mineral or organic fillers, pigments or dyes.

For the purpose of its use, composition (a) is advantageously in the form of granules having a size of between 1 and 10 mm, preferably between 2 and 5 mm. It may be prepared, in this granular form, by simple hot-mixing of its ingredients, between 150 and 200° C., preferably at approximately 160° C., by means of a twin-screw extruder equipped with a tool for cutting the extruded product as it leaves the die.

Constituent Polyethylene Compositions (b) and (c) of Layers B and C

The complexable thin layer B and the heat-sealable and breakable layer C are, respectively, made of a composition (b) of a PolyEthylene PE(b) and a composition (c) of a PolyEthylene PE(c).

The PolyEthylenes PE(b) and PE(c) may be identical or different.

According to a preferred embodiment, compositions (b) and (c) are compositions of the same PolyEthylene PE.

The identical or different PE(b) and PE(c), which are, respectively, included in compositions (b) and (c), are a polyethylene homopolymer (or copolymer) which may include:
- a linear polyethylene such as HDPE (High Density PolyEthylene),
- a linear low density polyethylene (LDPE),
- a linear very-low or ultra-low density polyethylene (VLDPE or ULDPE).

Such polyethylenes can be prepared by several methods, including polymerization in the presence of a Ziegler-Natta catalyst, metallocene-catalyzed polymerization, for radical polymerization. Among the PEs obtained by metallocene catalysis, mention may notably be made of the products of the Lumicene® range from Total.

Preferably, the PE used is a low density PE (also known as Low Density PolyEthylene or LDPE) obtained by a high pressure process.

Grades of such low density PEs are commercially available for different MFI values. The following may thus be mentioned:
- LDPE polyethylene LD0304 with an MFI of 4 g/10 minutes,
- LDPE polyethylene LA0710 with an MFI of 7.5 g/10 minutes, these two grades both being available from the company Total.

According to one embodiment, compositions (b) and (c) are made of a PE, which may be identical or different, preferably identical.

According to another embodiment, compositions (b) and (c) are PE-based compositions which comprise, in addition to said PE, an additive chosen from an anti-fogging agent, a processing aid, a slip agent and/or an antiblocking agent. According to an even more preferred variant, compositions (b) and (c) each consist of PE and an amount of said additive of up to 5% by weight, based on the total weight of the composition, even more preferably up to 3%.

It is common to observe, in the case of packaging consisting of a transparent thermoplastic material and containing a food product, notably a fresh product, the moisture content of which may be very high, the presence on the transparent exterior wall of the packaging of a mist originating from the condensation of the water that has evaporated from packaged product. The formation of this mist or fogging has the effect of masking from the consumer the packaged article whether it is meat, flowers or vegetables, thus reducing the attractiveness of the packaged article and the possibility, in the case of a food product, to be sure, simply by observing it visually, of its quality for the purpose of consumption. The use of an anti-fogging agent avoids this drawback. A nonionic surfactant is generally used for this purpose. This is because such an agent (also known by the term "anti-fog") causes, at the surface of the layer of thermoplastic material into which it has been integrated, spreading of the droplets of water forming the opaque mist, so as to form an invisible film of water which does not impair the transparency of the exterior layer of the thermoplastic material.

The incorporation of a processing aid reduces undesirable friction in the extruder. The reduction in friction is accompanied by a reduction in the extrusion pressure, which thus makes it possible to increase the rate of industrial production. Such agents are usually thermoplastic fluorinated (co) polymers.

A slip agent is often used to improve, by reducing the coefficient of friction, the running (or slipping) of the film at high speed on the rollers and other metal surfaces of the industrial lines, with which said film is in contact. Mention may be made in particular of the use of fatty acid amides for this purpose.

An antiblocking additive is used to prevent or limit the adhesion (or blocking) of the film on itself which is liable occur during the winding/unwinding of the film on a roll under industrial production conditions, and also under the effect of frictional forces. The following are used for this purpose:
- mineral compounds such as: diatomaceous earth, natural or synthetic silica, calcium carbonate, talc, aluminum and/or potassium silicates; or
- organic compounds such as fatty acid amides, such as stearates.

The amounts of anti-fogging agent, slip agent and antiblocking agent in compositions (b) and (c) may range from 0.1% to 5% by weight, preferably from 0.5% to 3%, based on the total weight of the corresponding composition. As regards the amount of processing aid in compositions (b) and (c), it may range from 0.01% to 0.5% by weight, preferably from 0.02% to 0.2%, based on the total weight of the corresponding composition.

Compositions (b) and (c) are:
- either commercially available in the form of granules, for example when they are made of PE;
- or can be readily industrially produced in the form of such granules, when they comprise, in addition to PE, additives such as those listed previously.

The size of these granules may be between 1 and 10 mm, preferably between 2 and 5 mm.

Multilayer Film

The multilayer film that is the subject of the invention comprises the adhesive layer A, the complexable thin layer B and the heat-sealable and breakable layer C, as defined previously.

According to one embodiment, the multilayer film that is the subject of the invention consists of these three layers A, B and C.

According to another embodiment, the multilayer film that is the subject of the invention comprises, in addition to the three layers A, B and C, additional thin layers required for the production of the packaging. Examples that may be mentioned include:
- a rigid layer required for the mechanical strength of the receptacle, or
- a printable layer, or else
- a layer with a barrier effect against oxygen, water vapor or else carbon monoxide.

The constituent materials of these layers may be chosen from:
- polyethylene (PE),
- polypropylene (PP),
- a copolymer based on ethylene and propylene,
- polyamide (PA),
- polyethylene terephthalate (PET), or else
- a copolymer based on ethylene, for instance a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
- polystyrene (PS),
- polyvinyl chloride (PVC),
- a lactic acid polymer (PLA), or
- a polyhydroxyalkanoate (PHA).

Among the thermoplastic polymers listed above, the following polymers are preferred for the layers additional to the layers A, B and C: PE, PP, PE-PP copolymer, PA, PET, EVA, EVOH, EMA or EBA.

The total thickness of the multilayer film according to the invention varies in a range from 20 to 300 μm, a range from 30 to 150 μm being more preferred, and a range from 40 to 80 μm being even more preferred.

As regards the thickness of the adhesive layer A, it preferably varies in a range of from 5 to 50 μm, a range of 7 to 25 μm being more preferred, and a range of 10 to 20 μm being even more preferred.

Finally, the thickness of the heat-sealable and breakable layer C also preferably ranges from 5 to 25 μm, and even more preferably from 10 to 17 μm.

The present invention also relates to a process for manufacturing the multilayer film as defined previously, characterized in that it comprises the flat sheet coextrusion of the constituent HMPSA composition (a) of layer A and the constituent compositions (b) and (c) of the layers B and C, at a temperature of between 150° C. and 250° C.

According to a preferred variant, the flat sheet coextrusion comprises the following sequential steps:
(i) the introduction, into three separate extruders, of the constituent compositions (a), (b) and (c), respectively, of the layers A, B and C in the form of granules having a size of between 1 and 10 mm, preferably between 2 and 5 mm,
(ii) the conversion by heating of said granules to the viscous liquid state,
(iii) the passage of the corresponding flows through a one-piece extrusion head comprising a set of rectangular dies each heated to a temperature below 250° C., so as to form a lap (or curtain) with three layers B/A/C, layer A being included between layers B and C,
(iv) the expansion of the lap in the direction of advance of the machine (also called "machine direction"), then
(v) the cooling of said lap.

The cooling of the lap can be ensured by means of a chill roll placed in the vicinity of the extrusion head, possibly in the presence of a vacuum box and an air knife, intended to better press the lap against the chill roll.

The geometrical features of the dies, and similarly the parameters of the process, such as the throughput speed of the lap on the chill roll (or "lift-off roll"), are set so as to obtain the desired thickness for the various constituent layers of the multilayer film.

The additional layers that are possibly included in the multilayer film according to the invention may be obtained:
- either by incorporating the corresponding constituent materials in the form of granules into the flat sheet coextrusion device;
- or via a process of complexing the film directly resulting from said coextrusion, using, for example, a polyurethane-based adhesive. This last variant may notably be applied to the introduction of a rigid layer, required for the mechanical strength of the receptacle.

The present invention also relates to the use of the multilayer film as described previously, for the manufacture of resealable packagings.

The use for producing resealable trays is particularly advantageous, and according to a particularly preferred embodiment for producing the cover film of these trays.

The examples that follow are given purely by way of illustration of the invention and should not in any way be interpreted to limit the scope thereof.

Examples A1, A2 and A3 (References):
Compositions (a) of Layer A

Each of the compositions A1, A2 and A3 is prepared beforehand in the form of granules about 4 mm in diameter, by simply mixing the ingredients listed in Table 1, using a twin screw extruder.

The MFI measured is also given in Table 1.

Example 1 (According to the Invention): B/A/C Three-Layer Film with Layer A Having Composition A1 and Layers B and C Made of LDPE with an MFI Equal to 4 g/10 Min This three-layer film is manufactured by means of a continuously operating flat sheet coextrusion pilot-scale device, in which device three extruders are fed:
- one is fed with composition A1 of Example A1, and
- the other two are fed with LDPE LD0304 from the company Total; the three compositions being in the form of granules having a size of approximately 4 mm.

This pilot device consists of a one-piece extrusion head with a rectangular die 250 mm wide and 300 μm high, and a chrome-plated chill roll cooled by an internal water circulation system.

The process parameters are adjusted so as to produce a three-layer film consisting:
- as layer A, of a layer with a thickness of 15 μm consisting of composition A1,
- as complexable thin layer B, of a layer with a thickness of 30 μm consisting of said LDPE;
- as heat-sealable and breakable thin layer C, of a layer with a thickness of 15 μm also consisting of said LDPE.

Among the parameters usually set, mention may be made of a temperature of 200° C. for the one-piece extrusion head and the rectangular die, and a line speed of 10 m per minute.

The three-layer film thus obtained has a total thickness of 60 μm and a length of 50 m and is packaged in the form of a reel with a machine width of 250 mm. The composition of layer A is shown in Table 2, as is the grade of LDPE used for layers B and C.

A check is made on the appearance of the resulting three-layer film, including the homogeneity of its thickness. The absence of sticky edges and the absence of "coextrusion waves" is noted, indicating the conformity of the film obtained. Such conformity is reported in Table 2 by the mention "OK".

The term "coextrusion waves" refers to the possible presence on a three-layer film obtained by flat sheet coextrusion of lines (or waves) that correspond to an excess thickness and indicate an unacceptable non-uniformity of thickness of said film.

Once the conformity has been established, the three-layer film is subjected to the tests B.1. and B.2. described below.

Test B.1. Measurement of the First-Opening Force by T-Peeling, at 23° C., of the Three-Layer Film Previously Heat-Welded on a PET/PE Complex Rectangular test specimens E1 that are 25 cm long and 3 cm wide are cut from the three-layer film B/A/C obtained previously.

In addition, a PET/PE complex film is used, consisting of a 23 µm thick PET layer which is laminated with polyurethane (2 µm layer) on a 50 µm thick PE layer. Rectangular test specimens E2 that are 25 cm long and 3 cm wide are cut from this complex film.

A test specimen E1 is then placed opposite between two test specimens E2, the three specimens being superimposed, so that layers B and C of E1 are in contact with the PE layer of E2.

Partial sealing is then performed using two heating clamping jaws at 130° C. applied under a pressure of 4.6 bar for 1 second, so as to obtain a sealed area of rectangular shape (15 cm in length and 1 cm in width). Said sealed area is arranged lengthwise and is located in the center of the assembly of the three superimposed test specimens, so that 5 cm of unsealed films protrude on both sides in the lengthwise direction, and 1 cm of unsealed films protrude on both sides in the width direction.

The loose film strips on one side of the three-test-specimen assembly, relative to the sealed area, are attached:

to a first attachment device (called a jaw) that is connected to the fixed part of a tensile testing apparatus, as regards the one of the two strips E2 that is facing layer C of E1, and to a second jaw connected to the movable part of said tensile testing apparatus, as regards the other strip E2 and the strip E1.

The fixed and mobile parts of the tensile testing apparatus, which is a dynamometer, are located on the same vertical axis.

The three strips thus fixed make it possible, by displacement of the jaws of the dynamometer, to solicit (or peel) the interface between layer C of the film B/A/C constituting E1 and the PE of E2 which faces it.

While a drive mechanism imparts a uniform rate of 300 mm/minute to the movable part, resulting in the peeling of the three sealed test specimens E1 and E2, the ends gradually move along a vertical axis with the formation of an angle of 180°. A force sensor connected to said movable part measures the force withstood by the test specimen thus held. The measurement is performed in a climate-controlled room maintained at a temperature of 23° C.

The force obtained is shown in table 2.

Test B.2. Measurement of the Second-Opening Force by T-Peeling, at 23° C., of the Three-Layer Film Heat-Welded on a PET/PE Complex The two parts of the preceding test specimen are, after peeling, repositioned facing each other and brought into contact manually. They are then subjected to a pressure exerted by means of a roller with a mass of 2 kg, with which a to-and-fro movement is performed in a direction parallel to the length of the test specimen.

A tensile test specimen is thus obtained which is identical in shape to that prepared for the preceding peeling test, which is then repeated.

The force obtained is shown in table 2.

Examples 2 to 5 (According to the Invention): B/A/C Three-Layer Films

For each of these examples, Example 1 is repeated:

optionally replacing composition A1 of layer A with composition A2 or A3 (detailed in Table 1), as shown in Table 2; and optionally replacing LDPE LD0304 in layers B and C with LDPE LA0710, as shown in Table 2.

The appearance of the resulting three-layer film is identical to that of the three-layer film in Example 1 and is noted as OK in Table 2.

Example 6 (Comparative): B/A/C Three-Layer Film with Layer A of Composition A3 and Layers B and C Made of LDPE with an MFI Equal to 7.5 g/10 Min Example 1 is repeated, replacing:

composition A1 of layer A with composition A3, and

LDPE LD0304 of layers B and C with LDPE LA0710, as shown in Table 3.

Coextrusion waves are observed on the resulting three-layer film, which have the effect of rendering said film non-compliant.

Examples 7 to 9 (Comparative): B/A/C Three-Layer Films with LDPE Layers B and C of MFI Equal to 2.3 g/10 Min Example 1 is repeated:

optionally replacing composition A1 in layer A with composition A2 or A3, as shown in Table 3; and replacing LDPE LD0304 in layers B and C with LDPE 1022FN24, also as shown in Table 3.

LDPE 1022FN24 is a low-density polyethylene with an MFI of 2.3 g/10 minutes. It is available from the company Total, and is in the form of granules with a size of between 1 and 10 mm, preferably between 2 and 5 mm.

Sticky edges and/or coextrusion waves are observed on the resulting three-layer film, which have the effect of rendering said film non-compliant.

TABLE 1

Composition (a) of layer A

| | Amount in weight/weight % | | |
|---|---|---|---|
| Ingredient | Ex. A1 (reference) | Ex. A2 (reference) | Ex. A3 (reference) |
| Quintac ® 3433 N | 59.7 | — | — |
| Quintac ® 3520 | — | 59.7 | — |
| Kraton ® D1111 | — | — | 59.7 |
| Escorez ® 1310 LC | 39.8 | — | — |
| Regalite ® R1125 | — | 39.8 | 39.8 |
| Antioxidant | 0.5 | 0.5 | 0.5 |
| MFI (in g/10 minutes) | 30 | 25 | 10 |

TABLE 2

B/A/C three-layer films according to the invention

| | | Ex. 1 | Ex. 2 | Ex. 3 | Ex. 4 | Ex. 5 |
|---|---|---|---|---|---|---|
| Layer A | Composition (a) | A1 | A2 | A3 | A1 | A2 |
| | MFI(a) (in g/10 minutes) | 30 | 25 | 10 | 30 | 25 |
| Layers B and C | LDPE grade | LD0304 | LD0304 | LD0304 | LA0710 | LA0710 |
| | $MFI_{(PE)}$ (in g/10 minutes) | 4 | 4 | 4 | 7.5 | 7.5 |
| B/A/C three-layer film | $MFI_{(a)}/MFI_{(PE)}$ | 7.5 | 6.2 | 2.5 | 4 | 3.3 |
| | Appearance of the film | OK | OK | OK | OK | OK |
| | First-opening force (N/cm) | 4.14 | 6.63 | 5.59 | 4.53 | 6.09 |
| | Second-opening force (N/cm) | 0.66 | 2.02 | 0.72 | 0.68 | 0.98 |

TABLE 3 comparative B/A/C three-layer films

| | | Ex. 6 (comp) | Ex. 7 (comp) | Ex. 8 (comp) | Ex. 9 (comp) |
|---|---|---|---|---|---|
| Layer A | Composition (a) | A3 | A1 | A2 | A3 |
| | $MFI_{(a)}$ (in g/10 minutes) | 10 | 30 | 25 | 10 |
| Layers B and C | LDPE grade | LA0710 | 1022FN24 | 1022FN24 | 1022FN24 |
| | $MFI_{(PE)}$ (in g/10 minutes) | 7.5 | 2.3 | 2.3 | 2.3 |
| B/A/C three-layer film | $MFI_{(a)}/MFI_{(PE)}$ | 1.3 | 13 | 10.9 | 4.3 |
| | Appearance of the film | coextrusion waves | coextrusion waves sticky edges | coextrusion waves sticky edges | coextrusion waves |

The invention claimed is:

1. A multilayer film comprising:
an adhesive layer A consisting of an extrudable HMPSA composition (a);
a complexable thin layer B consisting of a PolyEthylene (PE) composition (b) denoted PE (b); and
a heat-sealable and breakable layer C consisting of a PolyEthylene (PE) composition (c) denoted PE (c);
wherein layers B and C are bonded together by layer A and said film is characterized in that:
i. the melt flow indices of compositions (b) and (c), measured in g/10 minutes at a temperature of 190° C. and a total weight of 2.16 kg, and denoted MFI(b) and MFI(c), respectively, are each between 2.5 and 15 g/10 minutes; and
ii. the melt flow index of the HMPSA composition (a), measured in g/10 minutes at a temperature of 190° C. and a total weight of 2.16 kg, and denoted MFI(a), is such that the ratios MFI(a)/MFI(b) and MFI(a)/MFI(c) are each between 1.5 and 10.

2. The multilayer film as claimed in claim 1, characterized in that the melt flow indices MFI(b) and MFI(c) are each between 3 and 10 g/10 minutes, and the ratios MFI(a)/MFI(b) and MFI(a)/MFI(c) are each between 2 and 9.

3. The multilayer film as claimed in claim 1, characterized in that the MFI(a) is in a range from 4 to 100 g/10 minutes.

4. The multilayer film as claimed in claim 1, characterized in that the extrudable HMPSA composition (a) comprises, on the basis of the total weight of said composition:

from 40% to 70% by weight of a composition (a1) of styrene block copolymers comprising at least one elastomer block, said composition (a1) consisting, on the basis of its total weight:
of 10% to 90% by weight of at least one diblock copolymer selected from the group consisting of SI, SBI, SIB, SB, SEB and SEP, and
of 10% to 90% by weight of at least one triblock copolymer selected from the group consisting of SIS, SIBS, SBS, SEBS and SEPS,
wherein the total content of styrene units of said composition (a1) ranges from 10% and 40% by weight on the basis of the total weight of (a1); and
from 30% to 60% by weight of one or more tackifying resins (a2).

5. The multilayer film as claimed in claim 1, characterized in that compositions (b) and (c) are compositions of the same PolyEthylene PE.

6. The multilayer film as claimed in claim 1, characterized in that PE (b) and PE (c) are each a low density PE.

7. The multilayer film as claimed in claim 1, characterized in that composition (b) and (c) consisting of a PE.

8. The multilayer film as claimed in claim 1, characterized in that compositions (b) and (c) are PE-based compositions which comprise, in addition to said PE, an additive comprising an anti-fogging agent, a processing aid, a slip agent and/or an antiblocking agent.

9. The multilayer film as claimed in claim 1, characterized in that it consists of three layers A, B and C.

10. The multilayer film as claimed in claim 1, characterized in that it comprises, in addition to the three layers A, B and C, additional thin layers comprising:

a rigid layer, a printable layer, and/or a layer with a barrier effect against oxygen, water vapor or carbon monoxide.

11. The multilayer film as claimed in claim 1, characterized in that its total thickness varies in a range from 20 to 300 μm.

12. The multilayer film as claimed in claim 1, characterized in that the thickness of the adhesive layer A varies in a range from 5 to 50 μm and the thickness of the heat-sealable and breakable layer C varies in a range from 5 to 25 μm.

13. A process for manufacturing the multilayer film as defined in claim 1, comprising flat sheet coextrusion of the HMPSA composition (a) and of compositions (b) and (c) at a temperature of between 150° C. and 250° C.

14. A resealable packaging comprising the multilayer film defined in claim 1.

15. The resealable packaging of claim 14, wherein the multilayer film is a cover film of a resealable tray.

* * * * *